(12) United States Patent
Vild

(10) Patent No.: US 6,263,705 B1
(45) Date of Patent: Jul. 24, 2001

(54) HOT GLASS SHEET HANDLING APPARATUS INCLUDING OVERLAPPING ROLL CONVEYOR AND TOPSIDE TRANSFER PLATEN

(75) Inventor: Michael J. Vild, Toledo, OH (US)

(73) Assignee: Glasstech, Inc., Perrysburg, OH (US)

( * ) Notice: Subject to any disclaimer, the term of this patent is extended or adjusted under 35 U.S.C. 154(b) by 0 days.

(21) Appl. No.: 09/499,967

(22) Filed: Feb. 8, 2000

(51) Int. Cl.[7] .................................................. C03B 23/02
(52) U.S. Cl. .............................. 65/289; 65/25.4; 65/25.2; 65/169; 65/182.1; 65/182.2; 65/182.5; 65/370.1
(58) Field of Search .................................... 65/25.1, 25.2, 65/25.4, 169, 182.1, 182.2, 182.5, 289, 370.1

(56) References Cited

U.S. PATENT DOCUMENTS

| | | |
|---|---|---|
| 4,578,103 | 3/1986 | Fackelman . |
| 4,615,724 | 10/1986 | Fackelman . |
| 5,002,599 | 3/1991 | McMaster et al. . |
| 5,066,321 | 11/1991 | Kramer et al. . |
| 5,669,953 | 9/1997 | Schnabel, Jr. et al. . |
| 5,902,366 | 5/1999 | Schnabel, Jr. et al. . |

OTHER PUBLICATIONS

Stein, Jess; The Random House Dictionary of the English Language, p. 1544, the word "underlap.", 1967.*

* cited by examiner

*Primary Examiner*—Michael P. Colaianni
(74) *Attorney, Agent, or Firm*—Brooks & Kushman P.C.

(57) ABSTRACT

Apparatus (32) for handling hot glass sheets includes a roll conveyor (14) and a topside transfer platen (18) that overlap to provide assistance in the initial support of heated glass sheets by the topside transfer platen through the use of a vacuum and pressurized air respectively applied to first and second sets of holes (40, 42) in a downwardly facing surface (38) of the topside transfer platen.

4 Claims, 1 Drawing Sheet

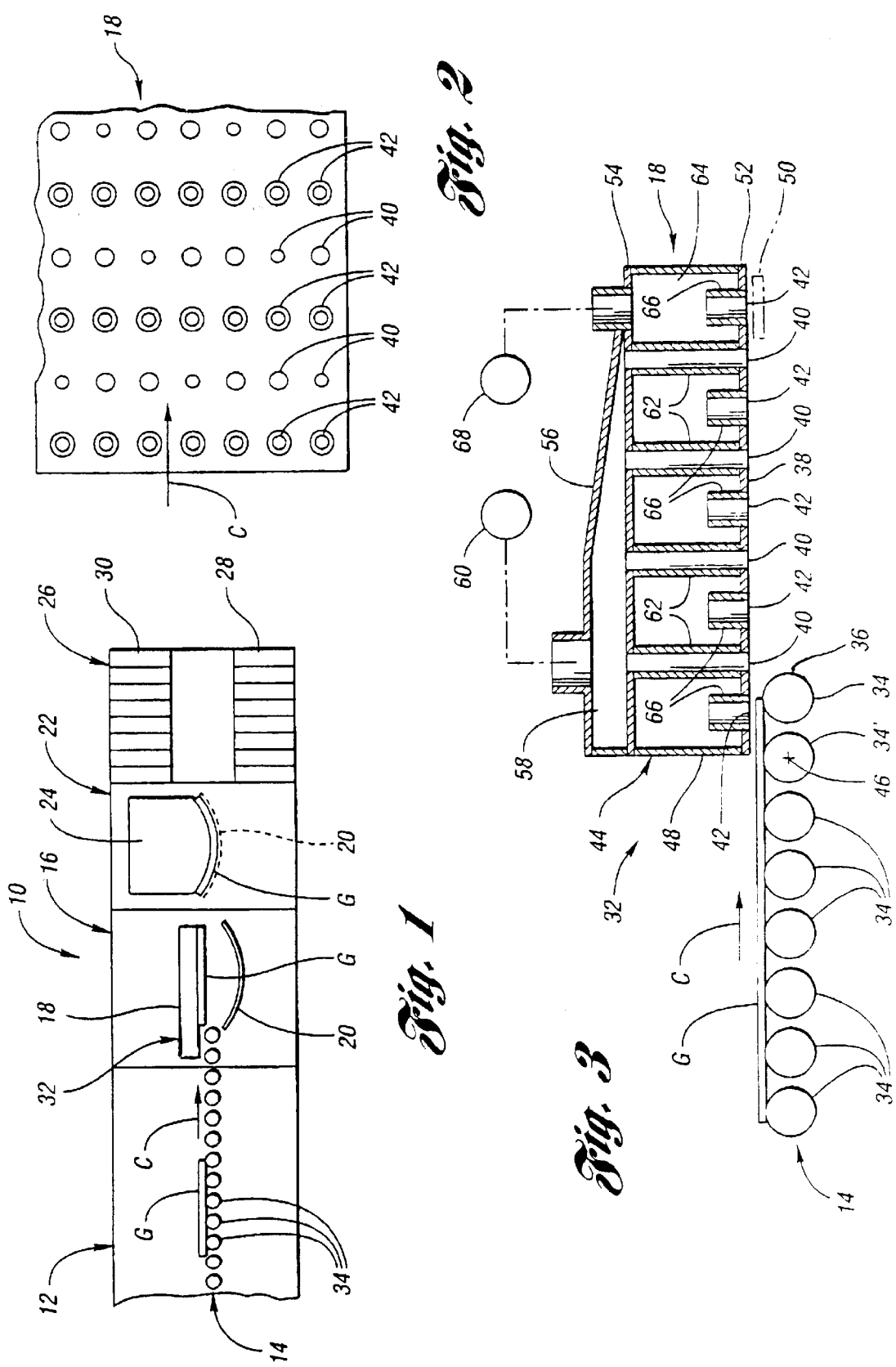

HOT GLASS SHEET HANDLING APPARATUS INCLUDING OVERLAPPING ROLL CONVEYOR AND TOPSIDE TRANSFER PLATEN

TECHNICAL FIELD

The present invention is to provide improved apparatus for handling hot glass sheets.

BACKGROUND ART

Glass sheets are conventionally formed by heating on a heating conveyor within a furnace until being sufficiently hot for deformation. The heated glass sheets are then transferred to a mold for forming either solely by that mold or in cooperation with one or more additional molds. U.S. Pat. No. 4,578,103 Fackelman and U.S. Pat. No. 4,615,724 Fackelman disclose a topside transfer platen that allows transfer of a heated glass sheet from a heating conveyor to a mold without any direct contact during the transfer. More specifically, the glass sheets are heated on a roll conveyor and then conveyed to the topside transfer platen which includes a downwardly facing surface having a first set of holes through which a vacuum is drawn and a second set of holes through which pressurized gas is supplied such that the glass sheet is supported without any direct contact with the topside transfer platen. As such, there is no possibility of scratching, marring or otherwise disfiguring the glass sheet surfaces during the transfer.

The inventions of the two Fackelman patents involve different structure and operation. In the U.S. Pat. No. 4,578,103 Fackelman patent, the topside transfer platen is fixedly mounted and the heating conveyor is a roll conveyor that is specifically disclosed as not overlapping the topside transfer platen since it was then thought that any overlap would result in obstruction problems with the transfer. In the U.S. Pat. No. 4,615,724 Fackelman patent, the topside transfer platen is movable upwardly and downwardly above the heating conveyor to permit a mold to move under the raised topside transfer platen with a heated glass sheet supported thereby so that the release of the vacuum would then provide the transfer to the mold for subsequent movement and cooling of the glass sheet. Both of these Fackelman patents disclose the topside transfer platen as being made of a refractory block including passages for respectively communicating the first and second sets of holes with sources of vacuum and pressurized gas to provide the support of the hot glass sheets without any direct contact.

Since the initial Fackelman inventions, topside transfer platens for handling hot glass sheets as described above have been made from fabricated metal capable of withstanding high temperatures, usually stainless steel, as disclosed by U.S. Pat. No. 5,002,599 McMaster et al. Also, positioners have been developed for positioning hot glass sheets while suspended from topside transfer platens as disclosed by U.S. Pat. No. 5,066,321 Kramer et al., U.S. Pat. No. 5,669,953 Schnabel, Jr. et al., and U.S. Pat. No. 5,902,366 Schnabel, Jr. et al.

DISCLOSURE OF INVENTION

An object of the present invention is to provide improved apparatus for handling hot glass sheets upon movement from a roll type heating conveyor to a topside transfer platen that provides support without any direct contact.

In carrying out the above object, the hot glass sheet handling apparatus of the invention includes a roll conveyor having a plurality of horizontally extending conveyor rolls spaced along a direction of conveyance along which hot glass sheets are conveyed on the conveyor rolls. The roll conveyor has a downstream end toward which the hot glass sheets are conveyed by the conveyor rolls. The apparatus also includes a topside transfer platen that is fixedly mounted at the downstream end of the roll conveyor. This topside transfer platen has a downwardly facing surface that is located at an elevation just slightly higher than the conveyor rolls. The downwardly facing planar surface has a first set of holes through which a vacuum is drawn to support a hot glass sheet received thereby from the roll conveyor. The downwardly facing planar surface also has a second set of holes to which pressurized gas is supplied to space the hot glass sheet from the downwardly facing planar surface. The topside transfer platen has an upstream end that overlaps the downstream end of the roll conveyor and the downstream end of the roll conveyor underlaps the upstream end of the topside transfer device with at least one conveyor roll located entirely below the downwardly facing planar surface to support the hot glass sheet upon initially being received by the downwardly facing planar surface of the roll conveyor.

In the preferred construction of the apparatus, the roll conveyor has a single conveyor roll located entirely below the upstream end of the topside transfer platen. The roll conveyor also preferably has another conveyor roll that is located immediately adjacent the single conveyor roll and that has a center located directly below an upstream extremity of the upstream end of the topside transfer platen. The preferred construction of the apparatus also has the roll conveyor provided with conveyor rolls that are made of sinter bonded fused silica.

BRIEF DESCRIPTION OF DRAWINGS

FIG. 1 is a schematic side elevational view of a glass sheet forming system that includes apparatus for handling hot glass sheets in accordance with the present invention.

FIG. 2 is an elevational view taken in section looking in the same direction as FIG. 1 but on an enlarged scale to illustrate a roll conveyor and a topside transfer platen that are constructed in accordance with the invention.

FIG. 3 is a bottom plan view of the topside transfer platen taken along the direction of line 3—3 in FIG. 2 to illustrate first and second sets of holes in a downwardly facing surface of the topside transfer platen to provide support of a glass sheet without any direct contact.

BEST MODE FOR CARRYING OUT THE INVENTION

With reference to FIG. 1, a schematically illustrated glass sheet forming system 10 includes a furnace 12 in which glass sheets G are heated on a heating conveyor 14 of the roll type. The heating is performed upon conveyance along a direction of conveyance illustrated by arrow C which is toward the right as shown. The forming system 10 also includes a transfer station 16 having a topside transfer platen 18 that transfers the hot glass sheets G to a lower mold 20 in preparation for forming. This topside transfer platen is fixedly mounted on suitable unshown framework and does not move during use as is hereinafter described. A forming station 22 of the system is located to the right of the transfer station 16 and includes an upper mold 24 that cooperates with the lower mold 20 after movement of the lower mold to the right, whereupon relative vertical movement between the molds provides press forming of the glass sheet to the shape between the molds. A cooling station 26 of system 10 includes lower and upper quench heads 28 and 30 for providing cooling gas that cools the formed glass sheet after movement thereof between the quench heads on the mold 20 or otherwise in any suitable manner. The roll conveyor 14 and topside transfer platen 18 collectively provide apparatus 32 that is constructed in accordance with the present invention as is hereinafter more fully described.

In understanding the hot glass sheet handling apparatus 32 of the invention, it should be appreciated that any type of mold forming with a single mold or multiple molds can be utilized in addition to the mold forming described above.

With reference to FIG. 2, the conveyor 14 includes a plurality of horizontally extending conveyor rolls 34 spaced along the direction of conveyance C along which hot glass sheets are conveyed on the conveyor rolls. The roll conveyor 14 has a downstream end 36 toward which the hot glass sheets are conveyed by the conveyor rolls 34.

With continuing reference to FIG. 2, apparatus 32 also includes the topside transfer platen 18 previously mentioned. This topside transfer platen as illustrated is fabricated from temperature resistant sheet metal such as stainless steel and has a downwardly facing planar surface 38 that is located at an elevation just slightly higher than the conveyor rolls. The downwardly facing planar surface 38 of the topside transfer platen has a first set of holes 40 through which a vacuum is drawn to support a hot glass sheet received thereby from the roll conveyor 14. The downwardly facing planar surface 38 of the topside transfer platen 18 also has a second set of holes 42 to which pressurized gas is supplied to space the hot glass sheet from the downwardly facing planar surface such that the support is provided without any contact with the glass sheet G. The topside transfer platen 18 has an upstream end 44 that overlaps the downstream end 36 of the roll conveyor 14 and the downstream end of the roll conveyor underlaps the upstream end of the topside transfer device with at least one conveyor roll, the conveyor roll 36 farthest to the right, located entirely below the downwardly facing planar surface 38 to support the hot glass sheet upon initially being received by the downwardly facing planar surface from the roll conveyor. More specifically, the roll conveyor 14 as shown has a single conveyor roll, the conveyor roll 34 located farthest toward the right, located entirely below the upstream end 44 of topside transfer platen. In addition, the roll conveyor has another conveyor roll 34' that is located immediately adjacent the single conveyor roll located farthest toward the right, and this conveyor roll 34' has a center 46 that is located directly below an upstream extremity 48 of the upstream end 44 of the topside transfer platen 18.

The apparatus 10 with the overlapping roll conveyor 14 and topside transfer platen 18 preferably has its roll conveyors 34 made from sinter bonded fused silica so as to be resistant to thermal warpage.

As illustrated in FIG. 3, the first and second sets of holes 40 and 42 are arranged in an alternating relationship along the direction of conveyance C so as to provide a uniform distribution of the vacuum and pressurized gas that support the glass sheet G from above without any contact as described above.

With reference back to FIG. 2, each heated glass sheet is positioned on the downwardly facing surface 38 by phantom line indicating positioning apparatus 50 which may be of any suitable type such as disclosed by U.S. Pat. No. 5,066,321 Kramer et al., U.S. Pat. No. 5,669,953 Schnabel, Jr. et al., and U.S. Pat. No. 5,902,366 Schnabel, Jr. et al., the entirely disclosures of which are hereby incorporated by reference.

With continuing reference to FIG. 2, the topside transfer platen 18 is preferably constructed in the manner disclosed by U.S. Pat. No. 5,002,599 McMaster et al., the entire disclosure of which is hereby incorporated by reference. More specifically, this topside transfer platen 18 as previously mentioned is fabricated from high temperature sheet metal such as stainless steel and includes a horizontally extending lower plate 52 that defines the downwardly facing surface 38 in which the first and second sets of holes 40 and 42 are provided as previously discussed. A horizontally extending upper plate 54 is located above the lower plate 52 and is covered by an upper sheet metal member 56 to cooperate therewith in defining a first chamber 58 in which a vacuum is drawn by a vacuum source 60. The upper plate 54 has holes communicated with the upper ends of tubular members 62 whose lower ends are communicated with the first set of holes 40 in the lower plate 52 to draw the vacuum at the downwardly facing surface 38 as previously described.

As also illustrated in FIG. 2, the lower and upper plates 52 and 54 of the topside transfer platen 18 cooperatively define a chamber 64. Short tubes 66 are mounted by the lower plate 52 with their lower ends providing the second set of holes 42 at the downwardly facing planar surface 38. A source of pressurized gas 68 feeds pressurized gas to the chamber 64 and through the short tubes 66 to provide pressurized gas to the downwardly facing surface 38. The short tubes 66 can be roll pins and provide sufficient flow length so the pressurized gas is supplied as jets that have the capability of spacing commercial size glass sheets from the downwardly facing planar surface 38 in association with the vacuum that is also drawn.

While the best mode for carrying out the invention has been described in detail, those familiar with the art to which this invention relates will recognize various alternatives, designs and embodiments for practicing the invention as defined by the following claims.

What is claimed is:

1. Apparatus for handling hot glass sheets, comprising:
   a roll conveyor including a plurality of horizontally extending conveyor rolls spaced along a direction of conveyance along which hot glass sheets are conveyed on the conveyor rolls, and the roll conveyor having a downstream end toward which the hot glass sheets are conveyed by the conveyor rolls; and
   a topside transfer platen that is fixedly mounted at the downstream end of the roll conveyor, the topside transfer platen having a downwardly facing planar surface that is located at an elevation just slightly higher than the conveyor rolls, the downwardly facing planar surface having a first set of holes through which a vacuum is drawn to support a hot glass sheet received thereby from the roll conveyor, the downwardly facing planar surface having a second set of holes to which pressurized gas is supplied to space the hot glass sheet from the downwardly facing planar surface, and the topside transfer platen having an upstream end that overlaps the downstream end of the roll conveyor and the downstream end of the roll conveyor underlapping the upstream end of the topside transfer device with at least one conveyor roll located entirely below the downwardly facing planar surface to support the hot glass sheet upon initially being received by the downwardly facing planar surface from the roll conveyor.

2. Apparatus for handling hot glass sheets as in claim 1 wherein the roll conveyor has a single conveyor roll located entirely below the upstream end of the topside transfer platen.

3. Apparatus for handling hot glass sheets as in claim 2 wherein the roll conveyor has another conveyor roll that is located immediately adjacent said single conveyor roll and said another conveyor roll has a center located directly below an upstream extremity of the upstream end of the topside transfer platen.

4. Apparatus for handling hot glass sheets, comprising:
- a roll conveyor including a plurality of horizontally extending conveyor rolls that are made of sinter bonded fused silica and that are spaced along a direction of conveyance along which hot glass sheets are conveyed on the conveyor rolls, and the roll conveyor having a downstream end toward which the hot glass sheets are conveyed by the conveyor rolls; and
- a topside transfer platen that is fixedly mounted at the downstream end of the roll conveyor, the topside transfer platen having a downwardly facing planar surface that is located at an elevation just slightly higher than the conveyor rolls, the downwardly facing planar surface having a first set of holes through which a vacuum is drawn to support a hot glass sheet received thereby from the roll conveyor, the downwardly facing planar surface having a second set of holes to which pressurized gas is supplied to space the hot glass sheet from the downwardly facing planar surface, the topside transfer platen having an upstream end that overlaps the downstream end of the roll conveyor and the downstream end of the roll conveyor underlapping the upstream end of the topside transfer device with a single conveyor roll located entirely below the downwardly facing planar surface to support the hot glass sheet upon initially being received by the downwardly facing planar surface from the roll conveyor, and the upstream end of the topside transfer platen having an upstream extremity that is located directly above a center of another conveyor roll that is located immediately adjacent the single conveyor roll located entirely below the downwardly facing planar surface of the topside transfer platen.

* * * * *